(No Model.) 5 Sheets—Sheet 1.

W. H. HULTGREN.
SAFETY DEVICE FOR ELEVATORS.

No. 493,724. Patented Mar. 21, 1893.

Witnesses
John Schuman.
John F. Miller.

Inventor
William H. Hultgren
By his Attorney
Newell S. Wright.

(No Model.)  5 Sheets—Sheet 2.

W. H. HULTGREN.
SAFETY DEVICE FOR ELEVATORS.

No. 493,724.   Patented Mar. 21, 1893.

Witnesses
John Schuman.
John F. Miller

Inventor
William H. Hultgren
By his Attorney
Newell S. Wright.

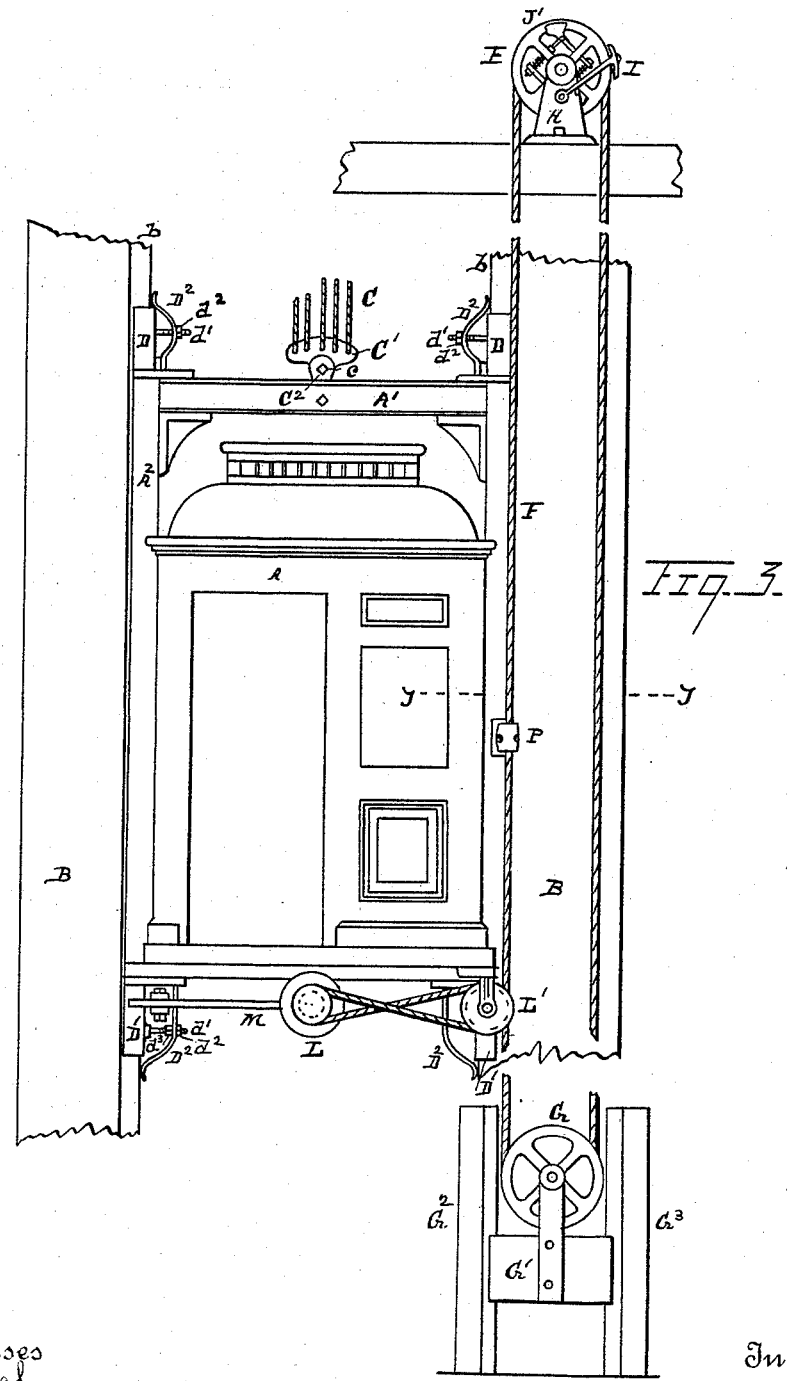

(No Model.) 5 Sheets—Sheet 4.
W. H. HULTGREN.
SAFETY DEVICE FOR ELEVATORS.
No. 493,724. Patented Mar. 21, 1893.
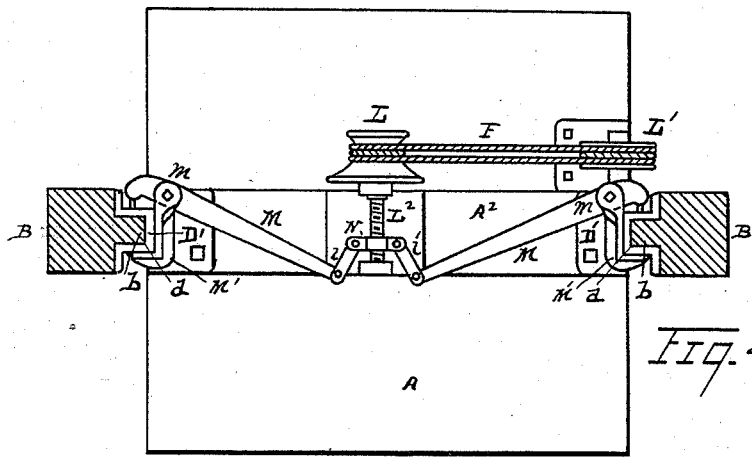
Fig. 4.
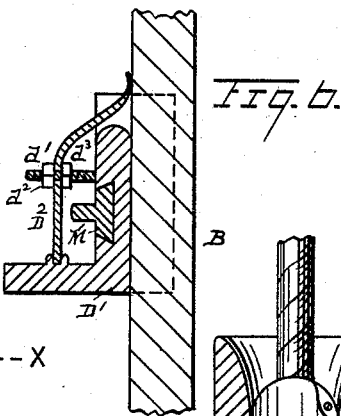
Fig. 5.
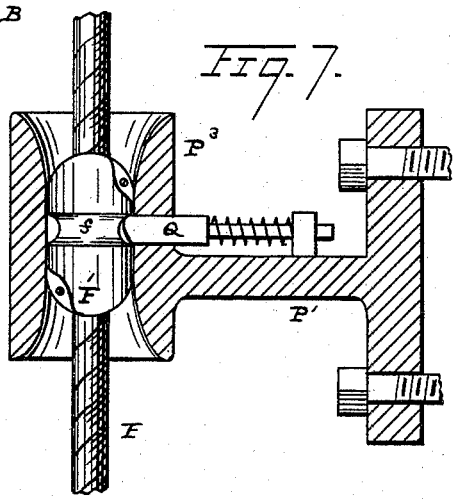
Fig. 6.
Fig. 7.
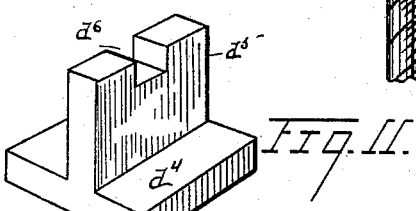
Fig. 11.
Witnesses
John Schuman.
John F. Miller.
Inventor
William H. Hultgren
By his Attorney
Newell S. Wright
THE NORRIS PETERS CO., PHOTO-LITHO., WASHINGTON, D. C.

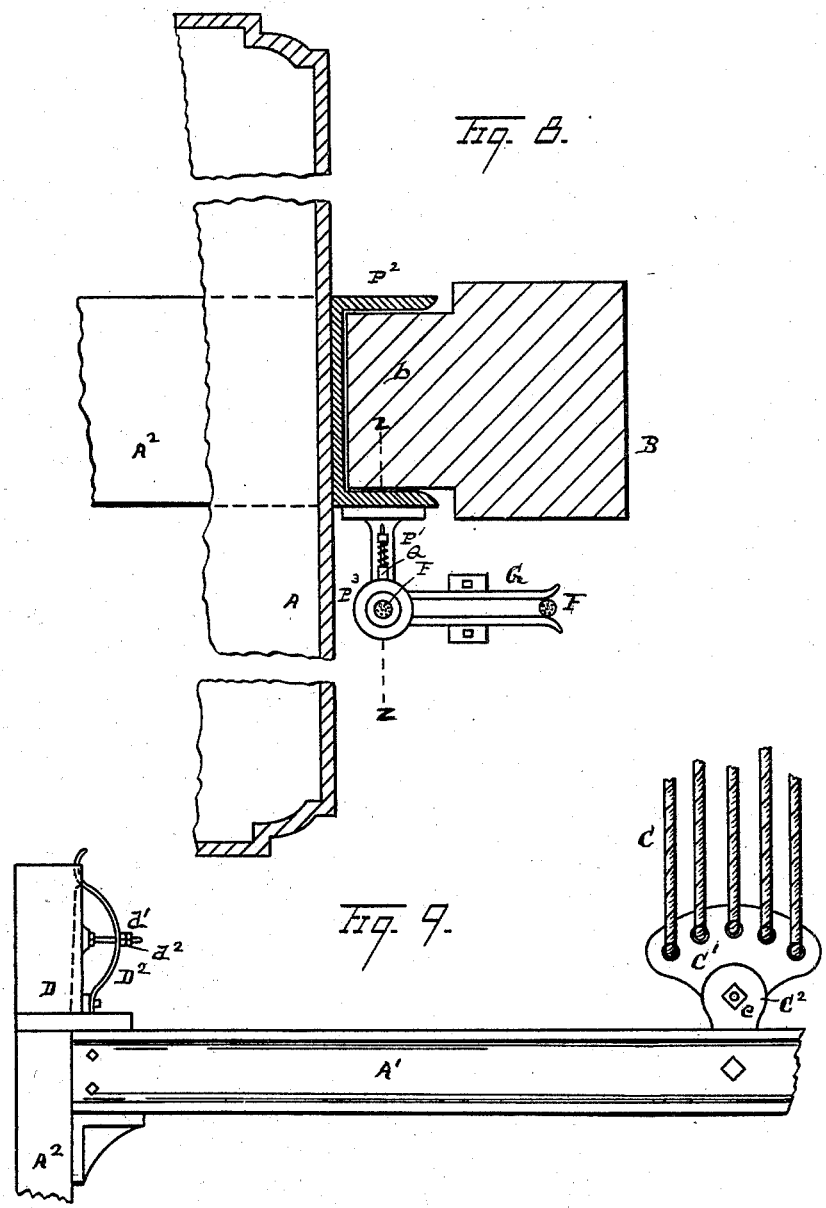

UNITED STATES PATENT OFFICE.

WILLIAM H. HULTGREN, OF DETROIT, MICHIGAN, ASSIGNOR OF THREE-FOURTHS TO THE MICHIGAN ELEVATOR AND ENGINE COMPANY, OF SAME PLACE, AND A. B. ELLITHORPE, OF CHICAGO, ILLINOIS.

SAFETY DEVICE FOR ELEVATORS.

SPECIFICATION forming part of Letters Patent No. 493,724, dated March 21, 1893.

Application filed August 5, 1892. Serial No. 442,261. (No model.)

*To all whom it may concern:*

Be it known that I, WILLIAM H. HULTGREN, a citizen of the United States, residing at Detroit, county of Wayne, State of Michigan, have invented certain new and useful Improvements in Safety Devices for Elevators; and I declare the following to be a full, clear, and exact description of the invention, such as will enable others skilled in the art to which it appertains to make and use the same, reference being had to the accompanying drawings, which form a part of this specification.

My invention relates to certain new and useful improvements in safety devices for elevators, and has for its objects a simple, durable and efficient construction and arrangement whereby the elevator will be effectually controlled and liability of accident overcome, while at the same time the operation of the features of the invention will prevent sudden shock or jar in case the elevator car is stopped thereby.

My invention also contemplates the general construction and combination of devices and appliances hereinafter specified and claimed, and illustrated in the accompanying drawings forming a part of this application, and in which—

Figure 1:
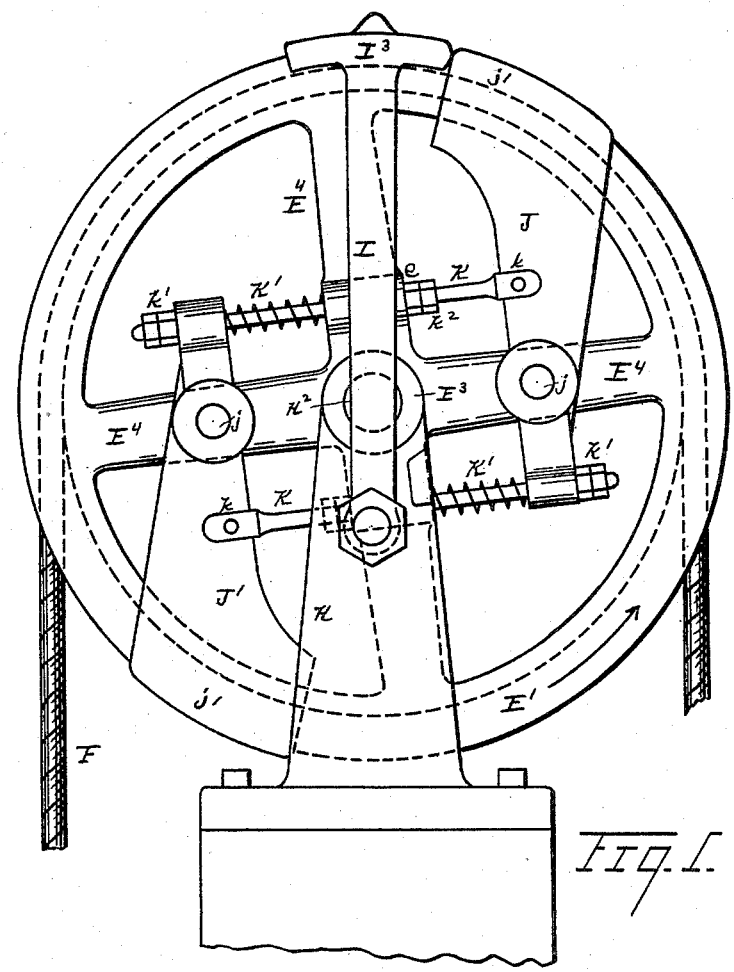
Figure 10:
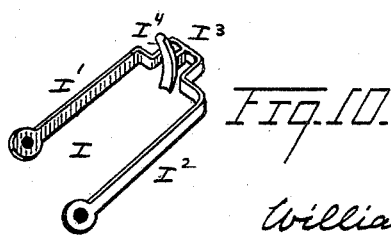
Figure 2:
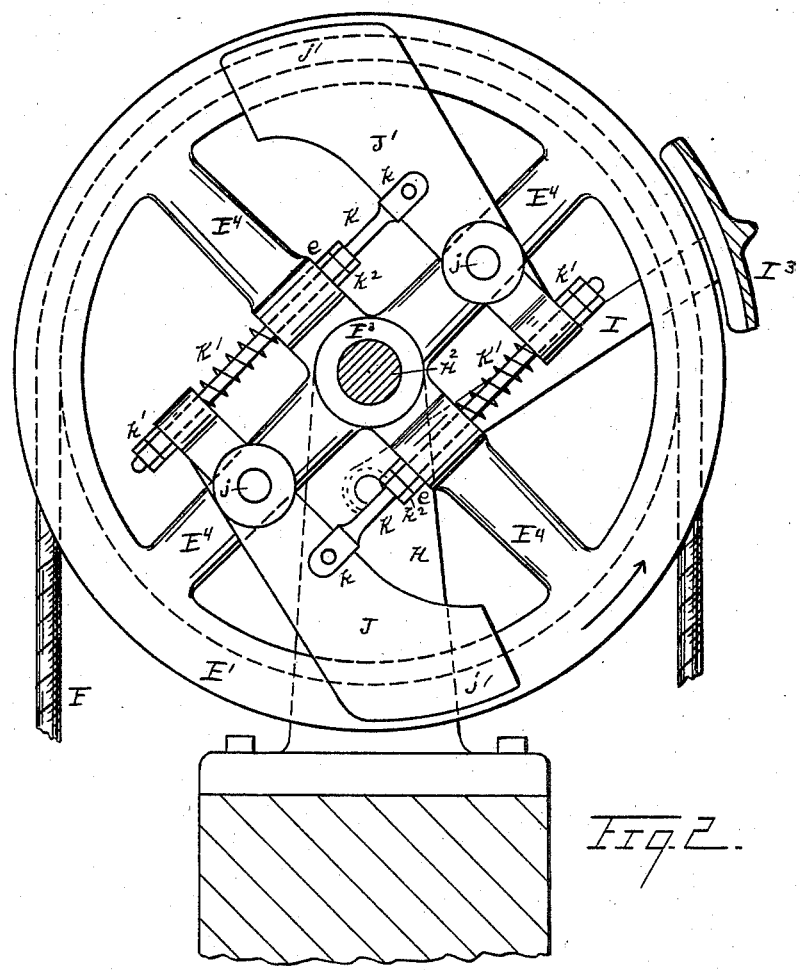
Figure 12:
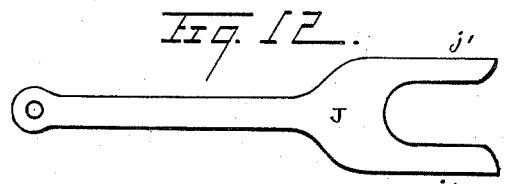

Figure 1 is a side elevation of the governor showing the brakes in the position they assume when in operation. Fig. 2 is a similar view of the same but showing the brakes in their normal position or when out of operation, the brake and shaft of the governor being in section. Fig. 3 is a front elevation. Fig. 4 is an inverted plan view of the elevator car and related devices, showing the guide posts and guide strips in cross section. Fig. 5 is a separate view of the brake lever showing one of the guide posts and guide strips, together with one of the lower guide shoes, in section. Fig. 6 is a cross section on the line $x$—$x$ Fig. 5. Fig. 7 is a separate view of the cable fastener in section on the line $z$—$z$ Fig. 8. Fig. 8 is a detail view of the cable fastener on the line $y$—$y$ Fig. 3. Fig. 9 is a separate view of one of the upper guide shoes and a portion of the lifting beam of the elevator car. Fig. 10 is a separate view in perspective of the brake on the governor. Fig. 11 is a detail view of a clamping block used in connection with the guide shoes. Fig. 12 is a view of one of the centrifugal arms.

I carry out my invention as follows:

A represents the elevator car, and B the guide posts at the sides of the car each provided with a guide strip "$b$." A' is the lifting beam of the elevator car frame $A^2$. C is the hoisting cable secured to a clevis C' having a jointed engagement with the bracket arm $C^2$ on said beam, as shown at "$c$." These parts may be of any desired construction.

The elevator frame is provided with upper guide shoes D D and with lower guide shoes D' D', made of metal, and recessed as shown at "$d$," Figs. 4 and 5, for example, to embrace the lateral faces of the guide strips "$b$" of the adjacent guide posts. The guide shoes are each provided with a spring $D^2$ bearing upon the edges of the guide strips adjacent to the car. The tension of the springs may be adjusted by a set screw "$d'$" engaged at its inner end against the guide shoe, and provided with nuts "$d^2$" "$d^3$" located on either side of the spring, as shown in Fig. 6, although the inner nut might be omitted. The lower guide shoes are also provided, preferably with a movable clamping block "$d^4$," the use of which will more fully appear hereinafter, the shoe being cut through to receive the block as shown in Fig. 5. The block is constructed with an outwardly extended arm "$d^5$" recessed as shown at "$d^6$" to receive one of the jaws of a clamping lever.

E denotes my improved governor, and F is a cable engaged thereupon at the upper end of the elevator well.

G is a sheave with which said cable is engaged toward the lower end of the elevator well, said sheave being supported upon a weight G' having a sliding engagement with guide posts $G^2$ $G^3$.

The governor E is constructed with a sheave or concaved rim E' to engage the cable F and is journaled in a standard H, $H^2$ being the shaft, and $E^3$ the hub of the governor. $E^4$ denotes the arms radiating from the hub to the rim. A brake I formed with arms I' $I^2$ extends over the sheave or rim of the governor, and is journaled at its extremities upon the standard H below the shaft H². Intermediate said extremities the brake is formed with a head I³ provided with a shoe I⁴ to bear upon the cable F when in operation. In its normal position the head of the brake drops down and away from the sheave leaving it free to rotate. It will be observed that the sheave and the brake are so journaled as to have an eccentric relation the one to the other.

J and J' denote weighted centrifugal arms journaled in the corresponding arms E⁴ of the governor as shown at "$j$." One extremity of each of these weighted arms is constructed with flanges "$j'$" extending along side the faces of the sheave or rim. With the opposite extremity of each of said weighted arms is engaged a rod K connecting it with the opposite weighted arm at a point between the journal and the flanged extremity thereof as shown at "$k$." Each of the rods K is provided with a spring "K'." By this construction it is evident, the centrifugal impulse of each of the arms J J' is communicated to the other, to make them act together. The arms J J' it will further be seen, travel with the sheave of the governor, while the brake has no normal connection therewith. Now it will be clear that upon any undue speed of the sheave of the governor, the outer extremities of the weighted arms J J' will have a centrifugal impulse, throwing outward their free extremities. It will therefore be seen that when the sheave rotates in the direction of the arrow, the weighted arm J will be carried about and will quickly strike against the under edge of the head of the brake and carry it up toward a vertical position, thereby causing the shoe of the brake to bind the cable upon the periphery of the sheave, and stop its rotation. Normally the centrifugal arms J J' rotate between the sheave and the head of the brake.

L and L' denote pulleys located and suitably journaled on the bottom of the car over which the cable F passes. The pulley L' is a guide pulley. The pulley L is mounted upon a screw threaded shaft L² with which are connected clamping lever jaws M M. To this end the shaft L² is provided with a threaded collar N united to the jaws M by means of connecting links "$l$" "$l'$," the links having a jointed connection with the jaws and collar. The collar, jaws and links forming in reality a toggle lever mechanism. Additional clamping jaws M' are jointedly connected with the jaws M M, respectively, as shown at "$m$." The jaw M' is arranged to grip upon one side of the adjacent guide shoe. The jaws M grip upon the adjacent guide strip "$b$," when brought into suitable position. Normally said jaws M are inoperative. But it will be evident that when the shaft L² is caused to rotate in a suitable direction by the rotation of its pulley L, the lever jaws M on each side of the collar will be so forced as to effect a grip with the related jaw, with such power as to effectually stop the car. The operation of the pulleys L L' will take place, and consequently the said jaws M become operative, whenever the brake I is operative.

Normally the cable F is unmovable relative to the car and consequently the pulleys L L' and shaft L² are normally inoperative. When however the brake I is set, then, of necessity the pulleys L L' are set in motion, to operate the clamping jaws M.

The cable F is held stationary relative to the car, and caused to travel normally therewith, by means of a locking device P, shown more in detail in Figs. 7 and 8, consisting of a bracket P' secured to a guide shoe P² secured to the frame work of the car. This bracket is provided with a hollow arm P³ through which the cable F passes. The cable is provided with a knob F' having an annular groove "$f$" upon its exterior, of such dimensions as to ride through the hollow arm P³. Normally, however the knob is held stationary in the said arm by means of spring latch Q, the inner end of which is normally engaged in the groove "$f$." This construction and arrangement locks the bracket P' upon the knob, in the customary operation of the elevator, to hold the cable stationary in relation to the car, and prevent the rotation of the pulleys L L' and the operation of the arms M M.

The inner end of the latch Q it will be observed is of such a form as to effectually lock the arm P³, upon the knob so that as the car ascends the cable is prevented from passing through the arm P³.

Should the car descend so rapidly, as to cause the brake I to set, then, the descending bracket P' will cause the spring latch to ride out of engagement with the annular groove "$f$" permitting the cable to move in relation thereto and operate the lever arms M M.

Inasmuch as the shaft L² must necessarily have a certain number of rotations to cause the jaws to grip the guide strips, the work of stopping the car will obviously be gradual and easy instead of causing a sudden concussion or stoppage, the injury of which is well understood.

Instead of causing the extremity of the jaw M to clamp the guide strip directly I prefer to employ the clamping block "$d^4$" above referred to, the jaw M engaging the recess "$d^6$" of said block. By this construction the block "$d^4$" may be provided with a desired frictional surface to be forced upon the guide strip. The jaw M' may have a dovetailed engagement with the guide shoe, as shown in Fig. 6.

It will be understood that the guide shoes D, D', are secured to the car and embrace the guide strips "$b$," in order to guide the car's movement, and it will also be seen that the jaws M' grip one side of the adjacent guide shoe, simply to afford a desired purchase for the jaws M, which, as described have a frictional contact upon the face of the guide strips to stop the elevator car. It will be obvious that the brake I is self releasing.

It will be perceived that the springs "K'" on the connecting rods K, serve to restore the arms J J' to their normal position, when the undue centrifugal force is spent, and also to prevent said arms from flying out and operating the brake in the normal operation of the elevator. By means of the nuts "k'" upon the end of each of the connecting rods the tension of the springs may be adjusted as required. I prefer that the connecting rods should pass through the intervening arms $E^4$ as indicated at "e," such a passage therethrough serving as a guide for said rods. Moreover by providing said rods with jam nuts "$k^2$" the centrifugal arms are stopped thereby from dropping farther away from the sheave than is required.

The cable F, it will be observed, is an endless cable.

I do not limit myself solely to the specific form of governor here explained, nor to the particular clamping devices on the car.

It will be perceived that by the use of the clamping devices on the car herein shown and described, no injury is liable to occur to the guide strips.

What I claim as my invention is—

1. In a safety device for elevators, the combination with the guide posts provided with guide strips, and an elevator car, of pulleys L, L', supported upon said car and movable therewith, a cable engaged with both of said pulleys, a shaft rotated by one of the pulleys, clamping mechanism mounted on the car and operated by said shaft, a governor provided with a brake device adapted to engage with and thereby control the movement of the cable, and means to hold the cable normally unmovable in relation to the car, substantially as described.

2. In a safety device for elevators, the combination with the guide posts provided with guide strips, and an elevator car, of a screw threaded shaft supported upon said car and movable therewith, pulleys L, L', clamping jaws M, M' operated by said shaft, and a cable engaging said pulleys, a governor provided with a brake device adapted to engage with and thereby control the movement of the cable, and means to hold the cable normally unmovable in relation to the car, substantially as described.

3. In a safety device for elevators the combination with an elevator car and guide strips, of guide shoes to embrace said guide strips provided with a block "$d^4$" movable in said shoe, a pulley carried by the car, a cable engaged with the pulley, a governor to engage and control the movement of said cable, means for normally causing the cable to move with the car and clamping appliances provided with arms M connected with said blocks to force them into contact with said guide strips and with arms M' to engage the guide shoe, substantially as described.

4. In a safety device for elevators the combination with an elevator car with guide strips of a cable, clamping mechanism connected with the car operated by said cable, a governor to control the movement of the cable, and a hollow arm $P^3$ carried by the car sleeved upon the cable, said arm provided with a spring latch to hold the cable normally unmovable in relation to the car, substantially as described.

5. In a safety device for elevators, a cable engaged with the elevator car, and a governor provided with a sheave engaged by said cable, said governor having in combination with said sheave centrifugal arms jointedly connected therewith, and a self releasing brake I extending over the sheave operated by said arms to bind the cable upon the periphery of the sheave, substantially as described.

6. In a safety device for elevators, a governor having in combination a sheave, centrifugal arms jointedly connected therewith, and a self releasing brake I extending over the periphery of the sheave operated by said arms, said arms having a simultaneous centrifugal movement substantially as described.

7. In a safety device for elevators a governor having in combination, a sheave, centrifugal arms jointedly united therewith and connected together, and a self releasing locking appliance extending over the periphery of the sheave, operated by said arms, substantially as described.

8. In a safety device for elevators, a governor having in combination, a sheave, weighted centrifugal arms jointedly engaged therewith, and connected to operate simultaneously and an oscillating self releasing brake I extending over the periphery of the sheave operated by said arms, substantially as described.

9. In a safety device for elevators, a governor having in combination, a supporting standard, a sheave journaled upon said standard, a cable engaged upon said sheave, a brake extending over the periphery of the sheave and journaled at its lower extremities on said standard, and centrifugal arms carried by the sheave to operate said brake and clamp the cable upon the periphery of the sheave, said brake journaled on said standard eccentrically to the shaft of said sheave substantially as described.

10. In a safety device for elevators, a governor having in combination, a sheave, a self releasing brake extending over the periphery of the sheave, centrifugal oscillatory arms to operate the brake, rods connecting said arms, springs to hold and restore said arms to normal position, said arms limited in their oscillation, substantially as described.

11. In a safety device for elevators, the combination with an elevator car suspended by a cable, guide strips therefor, clamping appliances mounted on said car to grip said guide strips, an additional cable to operate said clamping appliances, pulleys carried by the car engaged with said clamping appliances and with said additional cable, and means to control the operation of said additional cable, substantially as described.

12. In a safety device for elevators, the combination with a car suspended by a hoisting cable, guide strips therefor, clamping devices carried by the car an additional cable, pulleys upon said car engaged by the additional cable and operating said clamping device, a governor to control the movement of the additional cable and means to hold said latter cable normally unmovable with relation to the car, said clamping devices automatically operated by said additional cable upon the breakage of the hoisting cable, substantially as described.

13. In a safety device for elevators, a governor provided with a sheave, a brake journaled eccentric to the shaft of said sheave, and extending over the periphery thereof, and means to operate said brake, substantially as described.

14. In a safety device for elevators, a governor provided with a sheave, a standard in which the shaft of the sheave is journaled, a brake journaled in said standard independent of and eccentric to said shaft, and centrifugal arms to operate said brake, substantially as described.

In testimony whereof I sign this specification in the presence of two witnesses.

WILLIAM H. HULTGREN.

Witnesses:
N. S. WRIGHT,
JOHN F. MILLER.